United States Patent Office 3,554,958
Patented Jan. 12, 1971

3,554,958
PROTECTIVE COATING AND LUBRICANT
Robert V. Sandstrom, Moline, Ill., assignor to Sandstrom Products Company, a corporation of Illinois
No Drawing. Filed May 9, 1968, Ser. No. 728,074
Int. Cl. C08g 45/06, 51/26
U.S. Cl. 260—30.4
13 Claims

ABSTRACT OF THE DISCLOSURE

An air-drying composition for use as a protective and/or decorative coating and solid film lubricant for steel and other surfaces. The composition consists of a combination of low and high molecular weight polyepoxides in such proportions that when mixed with polymerizing catalysts and with solid lubricant such as molybdenum disulfide and corrosion inhibitors such as antimony trioxide and dibasic lead phosphite, the composition remains stable for long periods. When the polyepoxides are dissolved in a solvent composed of a major portion of methylene chloride and minor amounts of low molecular weight alcohol, low molecular weight ketone, and a glycol ether using a mixture of Freon and nitrous oxide as propellant, the coating can be packaged as an aerosol product which is not only stable but which can be sprayed onto a surface to produce a smooth, hard coating that dries within a few minutes. The resulting cured epoxy resin product has excellent protective and lubricating properties and can be colored to produce decorative coatings.

BRIEF SUMMARY OF THE INVENTION

Murphy Patent No. 3,314,885 discloses a composition composed of an epoxy resin, dioxane solvent, antimony trioxide, molybdenum disulphide and dibasic lead phosphite which produces an excellent solid film lubricant when applied as a coating to steel and other metallic objects. This material has the drawback that it must be baked onto the surface to which it is applied and therefore cannot be applied except where baking facilities are available.

The patent to Chisholm, No. 3,311,529, overcomes the drawback of having to bake the coating onto the object to be coated by providing an air-drying coating composition made by suspending pigments in a nitrocellulose in an alkyl resin vehicle, using a lacquer solvent. Chisholm also suggests use of polyepoxide and an epoxy catalyst such as a polyamide. When a composition such as that disclosed in Chisholm is made, using polyepoxide and an epoxy catalyst, the system is unstable and polymerizes within a period of about a week with the result that the resin deposits out of solution.

In accordance with this invention the instability of present air-drying epoxy-type solid film lubricant compositions is obviated by blending together in the composition two different polyepoxides, one being relatively low and the other being relatively high molecular weight. The less active high molecular weight epoxides stabilize the system indefinitely until the composition is applied in the form of a film to the surface to be coated. By incorporating proper solvents in the composition, a film can be produced from the composition which will dry in a period of a few minutes. Solvents such as the combination of methyl ethyl ketone, isopropyl alcohol and toluol; or paradioxane are suitable solvents when the product is used for brushing, dipping, or conventional spray application. The methyl ethyl ketone solvent is preferred since the resulting film dries more rapidly with this solvent composition than in the case of para-dioxane.

While coating compositions and solid film lubricants made by mixing the high and low molecular weight resin together are satisfactory when applied as brushing coatings, they cause difficulty when mixed with a propellant and the composition is used as an aerosol coating material. This is particularly true when Freon propellants such as dichloro difluoro methane are used. When sufficient Freon is incorporated with the coating to furnish enough propellant for the composition in the aerosol container, it causes the system to break down and the resin separates in the form of a livery mass. This problem has been overcome by providing a particular solvent composition in stable condition that enables the composition to be mechanically propelled in a finely atomized stream which produces an excellent coating. The solvent consists of a major proportion of methylene chloride with minor portions of a low boiling ketone, a low boiling alcohol and a glycol ether. The propellant is a combination of Freon and nitrous oxide.

While para-dioxane may be substituted for the above solvent in some applications, in general it is not satisfactory because its boiling point is too high to permit the coating to dry within the short period of time desired.

DETAILED DESCRIPTION

Compositions in accordance with this invention are prepared by mixing together, by weight, about 5% of polyepoxide solids, about 6% of pigments, sufficient catalyst to effect atmospheric curing of the resins, and the balance solvents. The polyepoxide solids are a mixture of low molecular weight polyepoxides having an average molecular weight of about 3200–4000 and polyepoxides having an average molecular weight of about 100,000 to 200,000. The polyepoxides are preferably made by condensing bisphenol A with epichlorohydrin. Since the lower molecular weight polyepoxides have proportionally more epoxy groups in the molecule they are more reactive than the high molecular weight polyepoxides. While I prefer to use a ratio of two parts of high to one part of low, the proportions of the two may vary from three parts of high to one part of low, to one part of high and three part of low.

A polyamide or other suitable catalyst capable of effecting complete cure of the resin at atmospheric temperature without forming an adduct is mixed with the resin in the amount of about 10%. There is incorporated in the resin solution finely divided solids which serve as lubricants, pigments or corrosion inhibitors. Where the composition is to be used as a solid film lubricant, molybdenum disulphide ($MoS_2$) is incorporated in the product. It is also desirable to incorporate in the product corrosion inhibitors such as antimony trioxide and dibasic lead phosphite. These and other similar additions also impart lubricative properties to the composition. In the event the composition is to be used as a protective coating rather than as a solid film lubricant, the molybdenum disulphide may be omitted and replaced by suitable coloring pigment. The total amount of solid materials other than polyepoxides in the composition is preferably not more than 6% of the total composition. Amounts substantially in excess of 6% may result in settling out of the pigment which must be avoided when the composition is packaged as an aerosol.

The preferred solvent for my coating composition when packaged as an aerosol is methylene chloride 77%, glycol ether 6.2%, isopropyl alcohol 5.4% and MEK 11.4% by weight, based on total solvent composition. This solvent composition not only gives a stable system but produces a coating film which dries rapidly. While para-dioxane is a suitable solvent, it has the drawback of drying more slowly than the aforesaid solvent composition and is therefore not suitable in many applications. However, where fast drying is not requisite para-dioxane may be used as the solvent.

If the composition is to be used for brush or roller coating and rapid drying is not too important, the combination of methyl ethyl ketone, isopropyl alcohol, toluol may be used in place of dioxane or the four component solvent above set forth. However, where the coating is to be packaged as an aerosol with Freon-type propellant, methyl ethyl ketone alone or together with toluene and isopropyl alcohol cannot be used becausethe system breaks down and the resin separates in the form of a livery mass. I have found that a particular solvent and a particular propellant composition is required in order to package the coating composition as an aerosol. It has been found that regardless of the solvent used for the coating composition, if Freon alone is used as the propellant it renders the coating composition unstable and the polyepoxide separates from the solution in a livery mass. However, by adding a mixture of Freon and nitrous oxide to the aerosol container, the deleterious effect of the Freon is overcome without adversely affecting the propellant properties of Freon. Freon is particularly desirable as a propellant because it is non-flammable and because it produces an explosive effect upon release from the can, causing fine atomization of the coating material with the result that a good film is laid down on the surface being coated. On the other hand, nitrous oxide is not satisfactory when used alone as the propellant because it propels the coating in the form of a liquid stream or in the form of droplets, resulting in a poor coating. I prefer to use the Freon and nitrous oxide in the proportions of about six parts of Freon to 2.55 parts of nitrous oxide by weight, although I have determined that three parts of Freon to one part of nitrous oxide will work satisfactorily. Since the nitrous oxide does not adversely affect the stability of the coating composition the proportion of nitrous oxide to Freon used is not critical so long as it is not so excessively large as to interfere with the atomizing effect of the Freon. On the other hand, care must be exercised not to have such a large ratio of Freon to nitrous oxide that the stability of the coating composition is adversely affected. The upper limit for Freon is 12 wt. percent for the solvent system used above. Freon may be increased to 20 wt. percent or more if large amounts of dioxane are introduced into the system, but the result is increased drying time, poorer atomization and less stability. The aforesaid percentages are based on total aerosol composition.

Although I have given a preferred solvent composition for use in the aerosol composition, it is to be understood that other low molecular weight ketones such as acetone and isobutyl methyl ketone may be substituted for all or part of the methyl ethyl ketone. Other low boiling alcohols such as methyl alcohol or ethyl alcohol may be substituted in whole or part for the isopropyl alcohol. Other glycol ethers may be substituted for the glycol monoethyl ether; for example, glycol monomethyl ether and glycol monoethyl acetate (Cellosolve acetate). While the proportions of the various components of the solvent given above are those preferred they may be varied to some extent to increase or decrease the drying time of the film.

The polyepoxide content of the composition should not be above about 7%. When polyepoxides are present in amounts substantially above 7%, as, for example, 10%, the composition will not atomize properly but instead is emitted from the aerosol valve in the form of small droplets.

Other corrosion inhibitors may be used in place thereof or together therewith, such as antimony trioxide, arsenic trioxide or the low solubility salts of chromium, molybdenum, selenium and vanadium.

Thus it will be seen that by incorporating a relatively high molecular weight polyepoxide which has low reactivity as compared to the low molecular weight polyepoxide, a coating composition containing an atmospheric curing catalyst, which is highly stable when maintained out of contact with air, can be prepared which is capable of setting up and air-drying under atmospheric conditions when applied as a film or coating to a metal surface or other surface to be protected or decorated, or to which it is desired to impart lubricity by the application of a solid film lubricant. Furthermore, by incorporating a specific solvent composition in the coating composition and using a combination Freon-nitrous oxide propellant, an aerosol coating composition results which is stable and which can be propelled from the aerosol can in an atomized mist which produces an excellent coating of hard texture providing long life to the article protected.

The Freons are trademarked products composed of fluorinated hydrocarbons or mixtures thereof. Such compounds or mixtures having suitable boiling points are excellent propellants because of the explosive atomizing effect they produce on the product as it is emitted from the valve of the aerosol container. Suitable Freon aerosol propellants such as Freon 12, 22, 113 and 114 are disclosed in Handbook of Material Trade Names, by Zimmerman and Lavine, Supplement, p. 91, published 1956, and Supplement III, pp. 100 and 101, published 1960, by Industrial Research Ceramic, Inc., Dover, N.H.

Suitable low molecular weight polyepoxides for use in preparing my novel coating composition are those polyepoxides marketed by Dow Chemical Company under the name "Dow Epoxy Resins" (D.E.R.). The low molecular weight resins sold by Dow under the designation D.E.R. have an average molecular weight between 3200 and 4000 and are prepared by reaction of epichlorohydrin and bisphenol A in accordance with the following reaction:

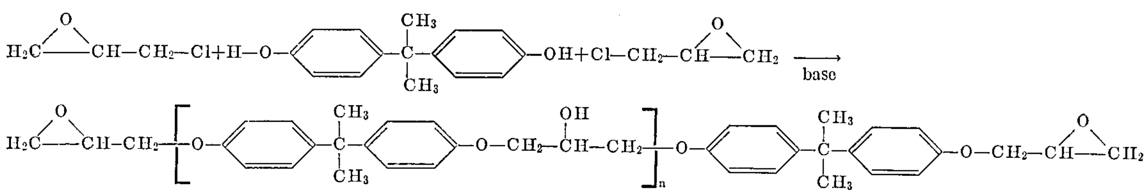

The resulting polyepoxide is a polyether of linearly recurring bisphenol moieties, polyetherified with hydroxyl bearing loweralkoxy moieties that are further etherified with bisphenol moieties, such alternate hydroxy-loweralkoxy and bisphenol moieties alternating substantially regularly until terminated by ether-linked epoxyloweralkoxy groups. The epoxy linkage is between adjacent carbon atoms as exemplified by the structure The resulting polyepoxides are not a pure specific chemical.

The higher molecular weight polyepoxides are preferably made in the same way as just described in connection with the preparation of the low molecular weight polyepoxides, the difference being in the number of $n$ groups in the molecule.

In preparing the coating composition for packaging in aerosol containers, the coating composition is thoroughly stirred before being placed in the aerosol can. The valve is then secured to the can and Freon injected in the proper amount. Nitrous oxide is then injected while the cans are shaken in order to dissolve $N_2O$ in the liquid contents of the can. While the order in which the nitrous oxide and Freon are added is not critical, best results are obtained by adding the nitrous oxide last since the order of addition is of some importance, involving a complex interplay between temperature and pressure. Freon is liquid at low pressure and if the can is chilled the Freon pressure may drop to 40 or 50 p.s.i. This represents very little back-pressure. If the procedure were reversed, i.e., nitrous oxide added first, mechanical problems would be encountered filling against the nitrous oxide head of 90 to 110 p.s.i.

I claim:
1. A coating composition comprising
   (a) a relatively unstable polyepoxide of poly-glycidyl ether of bisphenol A having an average molecular weight of about 3200–4000;
   (b) a second polyepoxide of poly-glycidyl ether of bisphenol A having an average molecular weight of about 100,000 to 200,000 and being less reactive than said first polyepoxide;
   (c) said polyepoxides being dissolved in a solvent which will provide desired drying time; and
   (d) a curing catalyst capable of curing said composition at atmospheric temperature, incorporated in said composition in sufficient amount to effect complete curing of a film of said coating composition when applied to a surface under atmospheric conditions;
   (e) the ratio of said second to said first polyepoxide being from 3:1 to 1:3 and sufficient to stabilize said composition when maintained out of contact with air; and
   (f) the weight content of said polyepoxide in said composition being approximately 5 to 7%.

2. A coating composition in accordance with claim 1
   (g) containing finely divided solid material in an amount not exceeding about 6%;
   (h) said solid material being selected from the group consisting of coloring pigments, solid lubricants and corrosion inhibitors.

3. A coating composition in accordance with claim 2 in which
   (i) the solid lubricant is present as molybdenum disulfide; and
   (j) the corrosion inhibitor is present as antimony trioxide and dibasic lead phosphite.

4. A coating composition in accordance with claim 3 in which
   (k) the solvent is from the group consisting of p-dioxane and a mixture containing a major portion of methylene chloride and minor amounts of a low boiling ketone, a low boiling alcohol and a low boiling glycol ether.

5. A coating composition in accordance with claim 3 in which
   (l) the solvent is a mixture of the following compounds in the approximate proportions by weight indicated:

| | |
|---|---|
| Methyl ethyl ketone | 11.4 |
| Isopropyl alcohol | 5.4 |
| Ethyl glycol ether | 6.2 |
| Methylene chloride | 77 |

6. A coating composition in accordance with claim 5 in which the total solids content of the composition is about 11% and the solid polyepoxide content is not in excess of about 7% by weight.

7. A coating composition in accordance with claim 4
   (m) packaged in an aerosol container with a mixture of Freon and nitrous oxide as propellant;
   (n) the proportion of nitrous oxide to Freon being such as to prevent the Freon from rendering the composition unstable without deleteriously affecting the ability of the Freon to propel the composition in a finely atomized spray.

8. A coating composition in accordance with claim 7 in which
   (o) the proportion of Freon to nitrous oxide is about 2 to 3 parts of Freon to 1 part of nitrous oxide and
   (p) the Freon does not exceed 12 parts of Freon per 88 parts of coating composition in the aerosol package.

9. A coating composition in accordance with claim 8 in which
   (q) the solvent is a mixture of the following compounds in the approximate parts by weight indicated:

| | |
|---|---|
| Methyl ethyl ketone | 11.4 |
| Isopropyl alcohol | 5.4 |
| Ethyl glycol ether | 6.2 |
| Methylene chloride | 77 | and
   (r) the composition contains about 5% total of finely divided molybdenum sulfide, arsenic trioxide and dibasic lead phosphite.

10. The method of preparing an aerosol coating composition comprising placing in an aerosol container a thoroughly mixed composition containing lower molecular weight polyepoxides having a molecular weight of about 3200–4000 and higher molecular weight polyepoxides having a molecular weight between about 100,000 and 200,000, and a solvent for the epoxides composed of a major portion of methylene chloride and minor amounts of a low boiling ketone, a low boiling alcohol and a glycol ether, the polyepoxide content of said composition being between about 5 and 7% by weight and the ratio of higher molecular weight to lower molecular weight polyepoxides being from 3:1 to 1:3, thereafter injecting Freon into the can in sufficient amount to furnish propellant for the composition, and then while shaking the container, injecting nitrous oxide in a sufficient amount to prevent the Freon from rendering the composition unstable and separating.

11. The method in accordance with claim 10 in which the solvent is a mixture methylene chloride —77%, glycol ether —6.2%, isopropyl alcohol —5.4% and methyl ethyl ketone —11.4%.

12. The method in accordance with claim 11 in which Freon is present in an amount not in excess of 12% of the total aerosol composition and the ratio of Freon to nitrous oxide is between 3:1 to 6:2.55.

13. The method in accordance with claim 12 in which the composition contains not more than about 6% of solids selected from the group consisting of lubricants, pigments and corrosion inhibitors.

References Cited
UNITED STATES PATENTS

| | | | |
|---|---|---|---|
| 2,735,829 | 2/1956 | Wiles et al. | 260—830(TW) |
| 3,314,885 | 4/1967 | Murphy | 252—25 |

MORRIS LIEBMAN, Primary Examiner

L. T. JACOBS, Assistant Examiner

U.S. Cl. X.R.

260—33.2, 33.4, 33.8, 830, 37